April 16, 1968    F. S. SCHILER    3,377,713
THREE-DIMENSIONAL LAYOUT DEVICE
Original Filed Oct. 8, 1958    2 Sheets-Sheet 1

INVENTOR.
FREDERICK S. SCHILER
BY
J. William Freeman
ATTORNEY

April 16, 1968     F. S. SCHILER     3,377,713

THREE-DIMENSIONAL LAYOUT DEVICE

Original Filed Oct. 8, 1958     2 Sheets-Sheet 2

INVENTOR.
FREDERICK S. SCHILER
BY
ATTORNEY

# United States Patent Office 3,377,713
Patented Apr. 16, 1968

3,377,713
THREE-DIMENSIONAL LAYOUT DEVICE
Frederick S. Schiler, Stow, Ohio, assignor to Portage Machine Company, Akron, Ohio, a corporation of Ohio
Continuation of applications Ser. No. 766,051, Oct. 8, 1958, Ser. No. 236,781, Nov. 8, 1962, and Ser. No. 456,880, Apr. 30, 1965. This application Mar. 8, 1967, Ser. No. 642,613
9 Claims. (Cl. 33—174)

ABSTRACT OF THE DISCLOSURE

A layout device for marking locations on planar surfaces comprising a linear measuring device acting between a supporting surface and the base of the layout device to accurately determine the distance of movement of the base. The supporting surface is provided with parallel grooves spaced apart fixed distances and means for engaging the linear measuring device in said grooves in order to accurately determine the distance of movement of the device.

---

Figure 1:
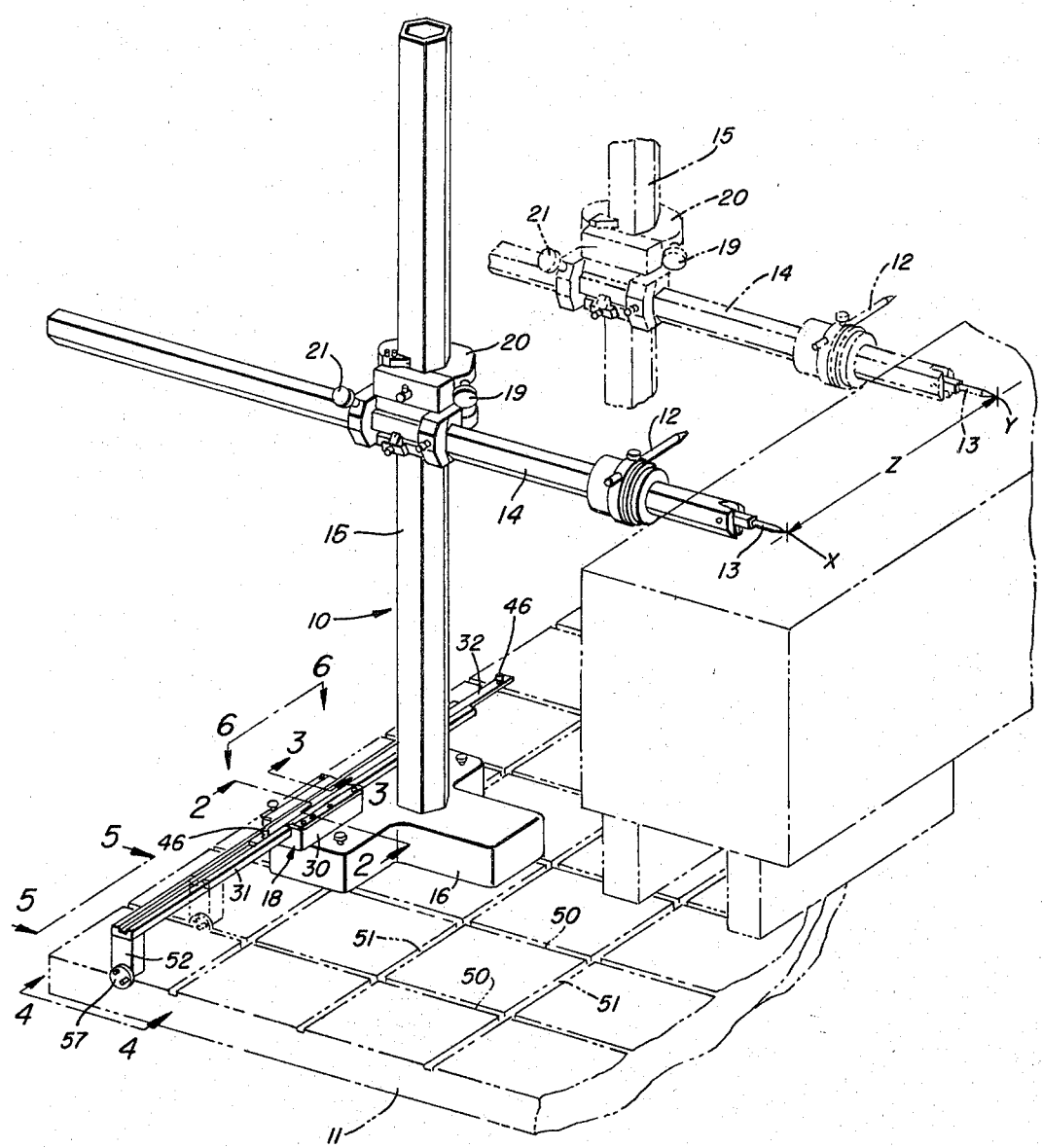

This application is a continuation of application Ser. No. 766,051, filed Oct. 8, 1958, now abandoned, application Ser. No. 236,781, filed Nov. 8, 1962, now abandoned and application Ser. No. 456,880, filed Apr. 30, 1965.

This invention relates to layout devices for marking locations on planar surfaces of solid bodies and in particular has reference to a new and improved type of layout device that is capable of making a layout in the three dimensional planes of a rough casting, for example.

In the art of machining heavy castings, for example, a foundry or other source normally delivers the rough castings to the machine shop where the same is to be machined to final dimension. It has been the experience of machine shop operators that castings of this general type are often inaccurately cast, and additionally, that such inaccuracy will not show up until considerable time has been spent effectuating preliminary machining operations on the same.

To eliminate this, it has been the practice in the past to lay out the hole or other patterns on the rough casting to see if the same is capable of machining to dimension. Normally, this is time consuming, but it has been found from a business standpoint that the same is, in actuality, a cost savings, since it eliminates unnecessary machining operations which would be otherwise done on the casting.

In effectuating such preliminary layout prior to machining operations, it has been the custom in the past to modify a conventional height guage by attaching thereto a scribing instrument. In this manner, the scriber can be adjusted to move through a plane having a certain height above the surface table, with the height of this plane being determined by the graduations provided on the height guage. However, to effectuate two dimensional markings on rough castings of this type, it has always been necessary to turn the casting on the work surface and, as a result, in the normal practice of checking castings in the manner described, it has been necessary to turn the piece several times during the layout operation. The disadvantages of such a procedure are believed manifest.

In applicant's copending application, Ser. No. 732,266, filed Mar. 24, 1958, and now U.S. Patent 3,069,778, there has been provided a three dimensional layout device that simplifies the above described layout procedure. In substance, the device of the above copending application enabled markings to be made in three dimensional planes without moving the casting.

While the device of the above referred to copending application has been entirely satisfactory for three dimensional layouts as described therein, it has been found that in the case of making extensive linear measurements, for example, between widely spaced points on a casting in any one given planar surface, that conisderable difficulty will be encountered in accurately measuring the distance between said markings. More specifically, in the event of laying out a pair of holes that are to be spaced approximatley 15 feet apart, it is believed manifest that no matter how the layout machine of the copending application is employed, that the same will have to be moved to effectuate successive markings, since the distance between the holes is beyond the measuring range of the same.

It has been discovered that the measuring of relatively large dimensions can be more accurately effectuated by attaching, to the layout device of the above referred to copending application, a linear measuring device that acts between the surface table and the base of the layout device to accurately determine the distance that the base of the layout machine is moved over the surface table. In this regard, it has been further found that if the surface table is provided with parallel grooves that are located at known distances apart, that the amount of linear movement can readily be determined if components of the linear measuring device are engaged in the adjacent grooves before and after such movement, followed by a subtraction of readings to determine actual distance. Thus, the layout device may be moved several feet if necessary past successive parallel grooves and subsequently positioned in a groove that is within the range of the scribing instrument of the layout device. At this time, the layout machine can be adjusted to scribe through the required point on the casting and the difference in readings on the scale of the linear measuring device plus the number of squares that have been passed will give a true and accurate reading relative to the distance between the first and second scribed marks.

Accordingly, it becomes the principal object of this invention to provide an improved type of three dimensional layout device that is characterized by the fact that the same includes a linear measuring device that enables the device to be used to measure distances beyond the measuring range of the layout device per se.

Other objects of the invention will become more apparent upon a reading of the following brief specification, considered and interpreted in the light of the accompanying drawings.

Figure 2:
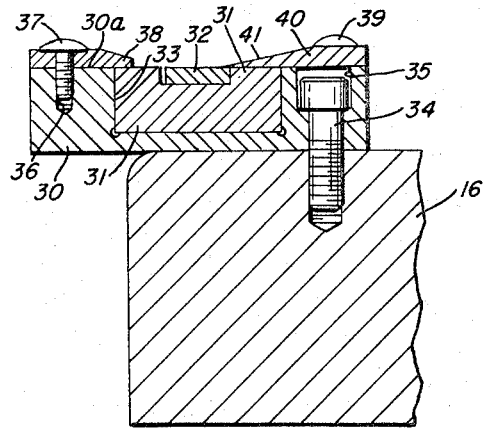
Figure 3:
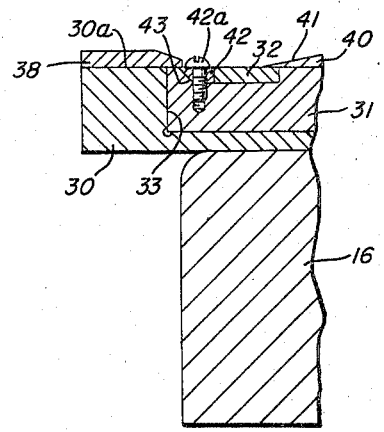
Figure 4:
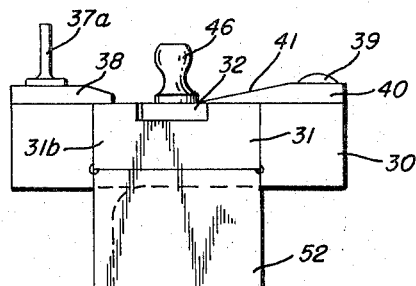
Figure 5:
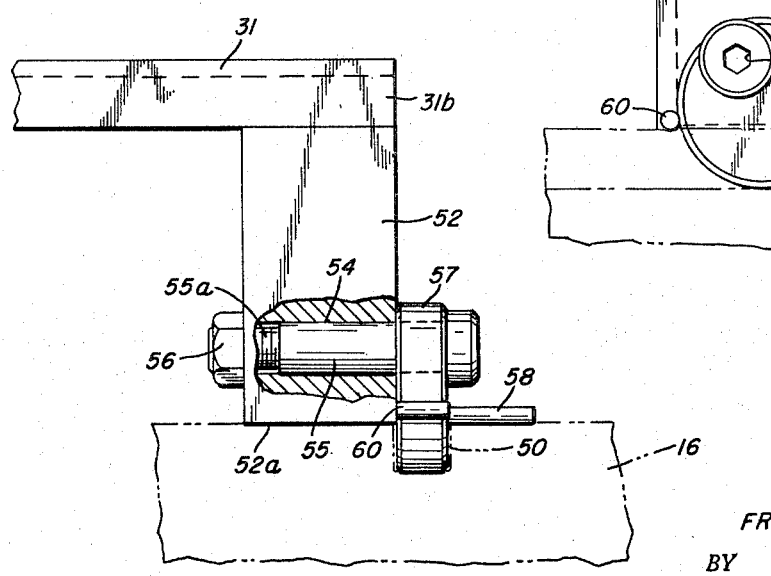

Of the drawings:
FIGURE 1 is a perspective view of the improved three dimensional layout device and showing the linear measuring attachment secured thereto, with the component parts being shown in full and chain-dotted lines for the purpose of illustration.
FIGURES 2 and 3 are vertical sections taken on the lines 2—2 and 3—3 of FIGURE 1.
FIGURES 4 and 5 are elevational views taken on the lines 4—4 and 5—5 of FIGURE 1.

Figure 6:
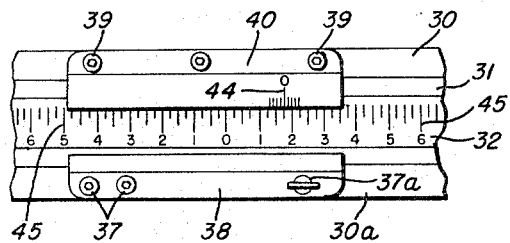

FIGURE 6 is a fragmentary plan view taken on the lines 6—6 of FIGURE 1.

Referring now to the drawings and in particular to FIGURE 1 thereof, the improved three dimensional layout device, generally designated by the numeral 10, is shown positioned on a surface table 11 so as to have scribing instruments 12 and 13 swingable through selected planes upon relative movement between a cross bar 14 and an upright standard 15, with standard 15 projecting upwardly from the base 16 that is positioned on the work table 11 as shown in FIGURE 1. Additionally, a linear measuring unit, generally designated by numeral 18, is shown secured to the base 16 so as to effectuate a measurement of the linear distance moved by the scribe 13, for example, during movement of the device 10 from the full to the chain-dotted line positions of FIGURE 1. In the illustration shown, the movement of the unit 10 from the full to the chain-dotted line positions permits the scribe 13 to mark the points X and Y, respectively and in this regard, the linear attachment 18 will measure the exact distance Z that exists between these two points.

With regard to the structure of the layout device 10, it is to be understood that the device illustrated herein is preferably of the type set forth in applicant's copending application, Ser. No. 723,266, filed Mar 24, 1958, and now U.S. Patent 3,069,778, and in this regard, it suffices to say that handle 19 effectuates movement of mounting bracket 20 relatively of upright 15, while handle 21 effectuates movement of bar 14 relatively of bracket 20. As shown, both the bar 14 and the upright standard 15 are graduated so that the differences between readings thereon can be easily ascertained in the manner that has been set forth in the above referred to copending application.

With reference now to the construction of the linear measuring attachment 18, it will first be seen that the same includes a support member 30, a carrier 31 and an indicating scale 32; the arrangement being such that the support member 30 is secured to the base 16 of device 10 so as to shiftably receive thereon the carrier 31 that, in turn, shiftably receives therein the scale 32 as will now be described.

Accordingly, and first referring to FIGURES 2 and 3 of the drawings, it will be seen that the support member 30 has a groove 33 extending longitudinally thereof and opening into the top surface 30a thereof as is clearly shown in the drawings, with member 30 being shown releasably secured to the base portion 16 by the use of the conventional cap screws 34, 34 that are received in the usual counterbores 35, 35 as to fix the member 30 with respect to the base portion 16.

Additionally, the top surface 30a of member 30 is provided with threaded apertures 36, 36 into which are threaded bolts 37, 37, with each bolt 37 passing through an appropriate aperture provided in a clamping plate 38. The clamping plate 38 has an edge portion overlying the carrier, as is clearly shown in FIGURES 2 and 3 of the drawings, and in this fashion, the same may be utilized to lock the carrier 31 with respect to support 30.

Additionally, a second set of bolts 39, 39 are passed through appropriate openings provided in an opposed retaining plate 40, with bolts 39, 39 being received within appropriate threaded apertures (not shown) provided in the surface 30a of carrier 30. In this manner, the tapering edge 41 of member 40 can overlie scale 32 as well as the uppermost surface 30a of support 30 to enable readings to be taken upon movement of carrier 31 and scale 32 relatively of support 30.

In addition to the aforementioned component parts and as best shown in FIGURE 3, a wedge block 42 is also retained within an appropriately contoured cutout 43 provided in the top surface of carrier 31, with bolt 42 preferably retaining the block in place as shown in the drawings. In this manner, the scale 32 can be locked against movement with respect to carrier 31, for measuring purposes as will be described.

Referring next to FIGURE 6, it will be seen that certain indicia have been provided for the purpose of effectuating measurement as will hereinafter be described. Accordingly, and to this end, the tapered portion 41 of plate 40 includes indicia while scale indicia 45 are similarly provided on the scale 32. Additionally, and as shown in FIGURE 4, the scale 32 preferably includes spaced handle knobs 46 that facilitate easier sliding movement of the device within the carrier 31, with it being understood that the preferred embodiment of the invention contemplates that at least one of the bolts 37, 37 be provided with an enlarged turning head such as is indicated by the numeral 37a in FIGURE 4 of the drawings. In this fashion, a clamping action can occur so that the overlying portion of the member 38, for example, can preclude shifting of the carrier 31 within groove 33, as previously described.

It has previously been indicated that the linear measuring device is preferably designed for use in connection with the surface table and in this regard, the preferred embodiment of the invention contemplates the use of a surface table having parallel grooves 50, 50 as well as oppositely extending parallel grooves 51, 51 with the spacing between the successive grooves preferably being identical so that these grooves may be used as measuring points.

In this regard and referring to FIGURES 4 and 5 of the drawings, it will be seen that the carrier 31 has its projecting end 31b provided with a depending flange 52, the lower planar surface of which is designed to engage the surface table 11 in substantially coplanar relationship therewith. Thus, the surface 52a may serve to maintain a condition of parallelism between the carrier 31 and the surface table 11 during movement of the carrier 31 relatively of support 30, it being noted that the carrier 31 is illustrated as having a length considerably greater than the length of support 30 so as to increase the range of distance that can be measured without shifting the base 16.

The preferred embodiment of the invention also contemplates the coaction between certain components of flange 52 and either the grooves 50, 50 or 51, 51 of surface table 11; and accordingly, and as shown best in FIGURES 4 and 5, the flange 52 is bored, as at 54, to receive a cylindrical stud 55 that includes a reduced threaded portion 55a that is encircled by a nut 56 as shown in FIGURE 5. Eccentrically mounted adjacent the opposed end of a member 55 is a cylindrical plate 57 having a projecting pin 58 that facilitates rotational movement of the eccentrically mounted plate 57 around the axis of member 55. Preferably, the member 57 is journalled around member 55 so as to be rotatable relatively thereof, with hex opening 55c permitting tightening in this regard. In this manner, a portion of the plate 57 can be positioned within groove 50, as shown in FIGURE 5, while a pin 60, projecting from flange 52, limits rotational movement of the plate 57 in the opposite direction so as to prevent accidental engagement.

In use or operation of the improved linear measuring device in connection with the layout device of the character described, it will be first assumed that the component parts have been assembled as indicated and further that the linear measuring attachment 18 has been secured to the base 16 of the device 10 as shown.

In this regard and assuming that it is desired to lay out the point Y at distance Z from point X, the lock bolt 37a will first be backed off so as to permit shifting of the carrier 31 with respect to support 30, and upon locating of the wheel 57 within the groove 50, for example, as shown in full lines in FIGURE 5, the scale 32 can be shifted relatively of the carrier 31 until the zero of indicia 45 coincides with the zero of indicia 44. At this time, the scale 32 can be locked with respect to carrier 31 by turning bolt 42a as previously described and assuming that the distance Z is less than the distance between parallel grooves 50, 50, the base 16 may be moved along the path of a groove 51, while the wheel 50 remains in a groove 51. When the scribing instrument 13 is at the required distance beyond zero as evidenced by reading scale 32, a mark may be made. Thus, if the distance between the grooves 50, 50, for example, is 10 inches and the dimension Z is to be 9 inches, the base 16 can be moved until the 9 marking of indicia 45 coincides with the zero marking of indicia 44.

If the distance Z, however, is in excess of 10 inches, for example, the plate 57 is positioned in a groove 50 and the base 16, scale 32, carrier 31 and support 30 are adjusted so that the zero markings of scales 44 and 45 coincide, followed by locking as before to prevent movement of scale 32 and support 30 relatively of carrier 31. After such tightening, the handle 58 is utilized to move plate 57 out of groove 50, at which time the entire base 16 is moved 20 inches into the parallel groove 50 that is spaced 20 inches from original groove 50, with the circular plate 57 being inserted within this groove to effect a 20 inch relocation of the entire base and parts associated therewith.

At this point, the scribing instrument 13 would have been moved 20 inches along the dimension line Z of FIG-URE 1 and upon loosening of bolt 37a, the base 16 could be moved relatively of carrier 31 and scale 32 until the numeral 4 of indicia 45 was in registry with the zero on scale 44. At this time, the scribing instrument would have been moved a distance of 24 inches and a marking could be obtained.

It is believed apparent that the linear measuring device could be used to measure distances extending in a direction that was normal to that just described, with grooves 51, 51 being used as locating points in such instances.

It is also to be noted that in the preferred disclosure of the invention, the indicia 44 are preferably of a conventional type that permit micrometric calibration of the reading so as to permit an increased degree of accuracy in known fashion.

While the preferred embodiment of the invention shown and described above contemplates the use of a wheel 57 operating in grooves 50, 50 or 51, 51, as the case may be, it is to be understood that the scope of the invention contemplates the elimination of the retractable wheel member in a situation where no grooves are provided on the surface table. In these cases, a scale or block could be clamped across the surface table and the flange 52 set against the same, followed by setting of the scales at zero registration as has been described. A second scale or block would also be clamped to the surface table at the desired distance and in this manner linear measurements could be obtained.

While member 13 has been referred to as a "scribing instrument" it should be understood that the machine could be used for inspection purposes in which case member 13 would be more properly referred to as an "indicating means."

While a full and complete disclosure of the invention has been set forth in accordance with the dictates of the Patent Statutes, it is to be understood that the invention is not intended to be so limited. Accordingly, where appropriate changes in material and configurations or dimension may be resorted to without departing from the spirit hereof.

What is claimed is:

1. A linear measuring device for use with a measuring guage that has a base portion movable over a surface table having at least one set of parallel slots provided thereon at equal distances from each other, comprising:
   (1) an elongate support member
       (a) secured to said base, and
       (b) having a guide track extending longitudinally thereof;
   (2) an elongate carrier
       (a) received in said guide track of said support in longitudinally shiftable relationship therewith, and
       (b) having an elongate guide track therein;
   (3) an elongate scale member received in said guide track of said carrier in longitudinally shiftable relationship therewith;
   (4) means for locking said carrier against movement relatively of said support;
   (5) means for locking said scale against movement relatively of said carrier; and
   (6) locking means
       (a) carried by said carrier, and
       (b) being retractable with respect thereto;
   (7) said means being engageable with said slot
       (a) whereby movement of said device relatively of said surface table is obviated.

2. The device of claim 1 further characterized by the fact that said locking means include
   (1) a wheel
       (a) pivoted on the free end of said carrier, and
       (b) being receivable in said slot.

3. The device of claim 1 further characterized by the fact that said carrier and said scale and said support are calibrated whereby the extent of projection of said carrier beyond said base can be measured.

4. A linear measuring device for use with a measuring gauge having a base portion that includes a planar surface slidably received on a surface table in substantially coplanar relationship therewith, comprising:
   (1) an elongate support member
       (a) secured to said base, and
       (b) having a guide track extending longitudinally thereof;
   (2) a carrier member
       (a) received in said track member of said support in longitudinally shiftable relationship therewith, and
       (b) having a guide track therein,
       (c) with said carrier having a projecting end that projects beyond said support member;
   (3) a scale member received in said guide track of said carrier in longitudinally shiftable relationship therewith;
   (4) means for locking said carrier against movement relatively of said support member;
   (5) means for locking said scale against movement relatively of said carrier; and
   (6) means carried by the projecting end of said carrier and being releasably engageable with said surface table intermediate its edges to determine the locations of said base thereon
       (a) whereby the linear distance between successive positions of said base on said table can be determined by said means.

5. A layout device for use on a surface table having a plurality of grooves, comprising:
   (1) a base
       (a) having a planar surface capable of being disposed in substantial parallelism with said surface table;
   (2) an elongate upright standard projecting from said base at right angles thereto;
   (3) a mounting bracket shiftably carried on said standard for movement along the longitudinal axis thereof;
   (4) an elongate cross arm carried by said mounting bracket in shiftable relationship therewith;
   (5) a support member
       (a) carried by said base, and
       (b) having an elongate groove therein that is substantially parallel with said planar surface;
   (6) an elongate measuring element received in said groove in longitudinally shiftable, projecting relationship therewith and releasably secured to said support member;
(7) means for measuring longitudinal movement of said measuring element relative of said groove;
(8) and stop means
(a) carried by and movable relatively of a projecting portion of said measuring element;
(9) said stop means
(a) being pivotable into and out of engagement within said grooves,
(b) whereby said measuring element is prevented from shifting;
(10) said base and said measuring element being shiftable relatively of said table as a unit during non-engagement of said stop means with said table.

6. The device of claim 5 further characterized by the fact that said elongate measuring element includes
(1) an elongate guide track therein; and
(2) a scale member received in said guide track of said measuring element in longitudinally shiftable relationship therewith;
(3) said scale member being releasably secured to said measuring element whereby said scale member may move with said measuring element when secured thereto and independently thereof when released therefrom.

7. A linear measuring device for use with a measuring guage that has a base portion movable over a surface table having at least one set of parallel slots provided thereon at equal distances from each other, comprising:
(1) an elongate support member
(a) secured to said base, and
(b) having a guide track extending longitudinally thereof;
(2) an elongate carrier
(a) received in said guide track of said support in longitudinally shiftable relationship therewith, and
(b) having an elongate guide track therein;
(3) an elongate scale member received in said guide track of said carrier in longitudinally shiftable relationship therewith;
(4) means for locking said carrier against movement relatively of said support;
(5) means for locking said scale against movement relatively of said carrier; and
(6) locking means
(a) carried by said carrier, and
(b) being retractable with respect thereto;
(7) said means being engageable with said slot
(a) whereby movement of said device relatively of said surface table is obviated;
(8) said slots being spaced equidistant from each other a distance less than the length of said scale member
(a) whereby accurate measurement of distances greater than the length of said scale member can be achieved.

8. A three dimensional measuring device of the character described, comprising:
(1) a surface table having a work supporting surface adapted to receive a three dimensional work piece thereon;
(2) elongate straight line type guide means extending transversely of said surface table;
(3) a base adapted to slidingly engage said guide means for linear movement with respect thereto;
(4) an elongate upright column fixedly carried by said base and being disposed at right angles to said work supporting surface;
(5) an adaptor bracket carried on said column and being slidable axially thereof;
(6) an elongate cross arm shiftably carried by said bracket for perpendicular movement with respect to
(a) the movement of said base on said guide means,
(b) the movement of said bracket on said column;
(7) first, second and third measuring means;
(8) indicating means carried by the projecting end of said cross arm, said indicating means being operable in first and second indicating positions; said indicating means coacting with said first and second measuring means when in said first indicating position; said third measuring means being substituted for one of said other measuring means when said indicating means is being operated in said second indicating position;
(9) three dimensional movement between said work piece and said indicating means occurring while said base is in sliding engagement with said guide means and as a result of
(a) movement of said base along said guide means,
(b) movement of said adaptor bracket along said column,
(c) movement of said arm relatively of said bracket; and
(10) said first, second and third measuring means being adapted to give three dimensional readings with respect to the said three dimensional movement of said indicating means relatively of said work piece on said work supporting surface.

9. A three dimensional measuring device of the character described, comprising:
(1) a surface table having
(a) a base portion having a planar surface;
(b) a series of identical work supporting segments
(1) of square configuration,
(2) of uniform thickness,
(3) arranged in superimposed relationship to said planar surface and being placed equidistant from each other by identical amounts whereby a network of identical right-angle grooves is provided with the top surfaces of said work supporting segments defining the over-all work supporting surface of said table and with said planar surfaces defining the depth of said grooves, and
(4) the edge surfaces of said segments being at right angles to said planar surface and the said top surface whereby said grooves are substantially U-shaped in configuration;
(2) elongate straight line type guide means extending transversely of said surface table;
(3) a base adapted to slidingly engage said guide means for linear movement with respect thereto;
(4) an elongate upright column fixedly carried by said base and being disposed at right angles to said work supporting surface;
(5) an adaptor bracket carried on said column and being slidable axially thereof;
(6) an elongate cross arm shiftably carried by said bracket for a perpendicular movement with respect to
(a) the movement of said base on said guide means,
(b) the movement of said bracket on said column;
(7) first, second and third measuring means;
(8) indicating means carried by the projecting end of said cross arm, said indicating means being operable in first and second indicating positions; said indicating means coacting with said first and second measuring means when in said first indicating position; said third measuring means being substituted for one of said other measuring means when said indicating means is being operated in said second indicating position;
(9) three dimensional movement between said work piece and said indicating means occurring while said base is in sliding engagement with said guide means and as a result of
   (a) movement of said base along said guide means,
   (b) movement of said adaptor bracket along said column,
   (c) movement of said arm relatively of said bracket; and
(10) said first, second and third measuring means being adapted to give three dimensional readings with respect to the said three dimensional movement of said indicating means relatively of said work piece on said work supporting surface.

References Cited

UNITED STATES PATENTS

| | | | |
|---|---|---|---|
| 2,002,348 | 5/1935 | Louviaux | 33—184.5 X |
| 2,095,059 | 10/1937 | Donnelly | 33—174 |
| 2,341,176 | 2/1944 | Buehrig | 33—174 |
| 2,462,003 | 2/1949 | Rose | 33—172 |
| 2,504,961 | 4/1950 | Braaten | 33—174 |

FOREIGN PATENTS

| | | |
|---|---|---|
| 52,422 | 2/1912 | Austria. |
| 1,119,375 | 4/1956 | France. |

SAMUEL S. MATTHEWS, *Primary Examiner.*